THERMOELECTRIC GENERATOR SUITABLE FOR USE AT ELEVATED TEMPERATURES IN A VACUUM

Filed Nov. 2, 1966 7 Sheets-Sheet 1

INVENTORS
SEYMOUR H. WINKLER
& RUDOLPH R. LAESSIG

BY Edward J. Norton
Attorney

INVENTORS
SEYMOUR H. WINKLER
& RUDOLPH R. LAESSIG
BY Edward J. Norton
Attorney

INVENTORS
SEYMOUR H. WINKLER &
RUDOLPH R. LAESSIG
BY Edward J. Norton
Attorney

INVENTORS
SEYMOUR H. WINKLER &
RUDOLPH R. LAESSIG
BY Edward J. Norton
Attorney

INVENTORS
SEYMOUR H. WINKLER &
RUDOLPH R. LAESSIG
BY Edward J. Norton
Attorney

May 5, 1970 S. H. WINKLER ET AL 3,510,363

THERMOELECTRIC GENERATOR SUITABLE FOR USE AT ELEVATED TEMPERATURES IN A VACUUM

Filed Nov. 2, 1966 7 Sheets-Sheet 6

INVENTORS
SEYMOUR H. WINKLER
& RUDOLPH R. LAESSIG
BY Edward J. Norton
Attorney

Inventors:
SEYMOUR H. WINKLER &
RUDOLPH R. LAESSIG
By Edward J. Norton
Attorney

United States Patent Office 3,510,363

Patented May 5, 1970

3,510,363

THERMOELECTRIC GENERATOR SUITABLE FOR USE AT ELEVATED TEMPERATURES IN A VACUUM

Seymour H. Winkler, Princeton, N.J., and Rudolph R. Laessig, Sumneytown, Pa., assignors to RCA Corporation, a corporation of Delaware Filed Nov. 2, 1966, Ser. No. 591,506

Int. Cl. H01v *1/02*

U.S. Cl. 136—205 12 Claims

ABSTRACT OF THE DISCLOSURE

The operating temperature of a thermoelectric generator is controlled by spaced multiple-foil thermal insulation which when heated slightly oxidizes or corrodes in the atmosphere to form a stable coating, but which coating evaporates or disappears in a vacuum. This results in the reflectivity of the foil and hence the operating temperature of the generator being substantially lower within the atmosphere than it is in a vacuum. Further, the presence between adjacent spaced foils of a normally good insulator material, which in response to excessive temperatures becomes a relatively poor insulator material, limits the maximum temperature of the thermoelectric generator. In addition, a slowly leaking inert gas within the thermal insulation of the generator may be utilized to slowly increase the amount of insulation provided to thereby compensate for a slow decrease which in certain cases takes place in the heating ability of the heat source of the generator. This maintains the operating temperature of the generator more constant than it otherwise would be.

This invention relates to improved thermoelectric generators, particularly to thermoelectric generators that are to be operated at high temperatures, and to improved multiple-foil thermal insulation suitable for use at high temperatures and, in particular, suitable for use in thermoelectric generators operated at high temperatures. As here used the term thermoelectric generator applies generally to generators employing energy conversion devices which convert heat into electricity.

The invention will first be described with particular reference to a thermoelectric generator designed particularly for use in satellites, such as communication or weather satellites for example. In general, for efficient operation, such generators should be operated at a high temperature. For example, if the energy conversion device comprises thermocouples, the hot-junctions of the thermocouples should be operated at a high temperature so that there is sufficient temperature difference between the hot-junctions and the cold-junctions. This is because there is a practical limit to how low the temperature of the cold-junctions can be held because their temperature is held low by means of a radiator. The lower the temperature to which the cold-junction is held, the greater must be the area of the radiator. The use of a large radiator on a satellite is undesirable.

A thermoelectric generator operating at high temperatures requires particularly good thermal insulation so that the quantity of fuel (such as strontium-90) used as the heat source is minimized and so that the weight of the generator is minimized. Also, in the case of a satellite generator particularly, it is highly desirable that the generator can be put into operation in the atmosphere (not in a vacuum) before launch without causing the thermal insulator to be inefficient after the satellite is in orbit. Further, in the case of a satellite generator, it is desirable that when the generator is put into operation in the atmosphere the fuel capsule does not reach such a high temperature that the metal of the capsule is greatly weakened. The reason for this is that, in the event of a launch abort which results in the satellite falling back to earth, the fuel capsule should have good strength so that it will not break upon impact and scatter the strontium-90 or other fuel and contaminate the area. It is also desirable in the case of a satellite generator that provision be made to prevent runaway of the heat source temperature and thus avoid destruction of the fuel capsule and release of strontium-90 or other nuclear fuel material in space.

In our generator we employ multiple-foil thermal insulation comprising a metal foil that, among the other required characteristics, has the characteristic that any oxide or corrosion that forms on it as a result of heating it in the atmosphere will evaporate or disappear in a vacuum, thus restoring the foil to high reflectivity to infrared thermal radiation. This metal foil also has the characteristic that it will oxidize or corrode at a slow rate in the atmosphere and will form a comparatively stable oxide or stable corroded surface. As a result, during launch and prelaunch the thermal insulation is a relatively poor insulation that permits considerable heat to be transferred from the capsule through the insulation. This holds down the capsule temperature so that the capsule strength remains considerably higher than it is at its normal elevated temperature after the satellite is in orbit and the foil corrosion has disappeared.

In the thermal insulation the successive layers of metal foil preferably are spaced apart by a suitable ceramic paper or the like which will melt, fuse, or otherwise change state, to provide conduction from foil to foil if the heat source temperature begins to run away and reach too high a temperature. This melting or change of state should occur before the capsule temperature becomes so high that there is danger of damage to or destruction of the capsule.

An object of the invention is to provide an improved thermoelectric generator.

A further object of the invention is to provide an improved thermoelectric generator for a satellite that may be put in operation in the atmosphere before the satellite is shot into space, and which will be in efficient operating condition after it is in space.

A further object of the invention is to provide an improved thermoelectric generator having a fuel capsule inside a chamber of thermal insulation having the characteristic that the thermal insulation is relatively poor while it is being heated in the atmosphere by the fuel, but which is good after the insulation has been in a vacuum for a reasonable period of time.

A further object of the invention is to provide an improved thermoelectric generator having a fuel capsule inside a chamber of multiple-foil thermal insulation having the characteristic that in the event of a runaway rise in the fuel capsule temperature the thermal insulation will become poor insulation before said temperature becomes too high.

A further object of the invention is to provide an improved multiple-foil thermal insulation.

A still further object of the invention is to provide an improved multiple-foil thermal insulation which may be heated to a high temperature in the atmosphere without damaging its heat insulating properties after it has been placed in a vacuum.

A still further object of the invention is to provide an improved thermoelectric generator having an energy conversion device that is heated without any great change in temperature when heated by a heat source which gradually decreases in its heating ability.

As applied to satellites, the invention takes advantage of the fact that a satellite in space is in a vacuum.

In one embodiment of our thermoelectric generator, as designed particularly for use in a satellite, thermocouples are employed that may be heated at the hot-junction ends to a very high temperature. This makes possible an efficient generator. Thermal insulation of the multiple-foil type is provided which forms a closed chamber containing the heat source which may be a radioisotope, for example. The multiple-foil thermal insulation comprises spaced layers of metal foil of a selected metal having certain required characteristics discussed hereinafter. The thermocouples are positioned in openings formed in the thermal insulation so that one end of a thermocouple is inside the chamber facing the heat source, and the other end (the cold-junction) is outside the chamber where the temperature of the cold-junction is held comparatively low by means of a radiator.

The layers of metal foil of thermal insulation at the inner side of the chamber become so hot that care must be taken to select foil of a metal that will not melt or disintegrate at this heat. It is also requider that, for good thermal insulation, the foil be of a metal that is highly reflective of infrared or heat waves. A third important requirement is that the foil be of a metal that can be heated to a high temperature in the atmosphere without being destroyed, and that the oxidization or corrosion that results will evaporate substantially completely in vacuum. This last requirement is necessary because the oxidized or corroded metal does not have high reflectivity for heat waves, and such reflectivity is required for good thermal insulation. A fourth important requirement, particularly in generators that are to be launched into space, is that the foil be of a metal that oxidizes or corrodes at a slow rate in the atmosphere and forms a relatively stable oxide or corroded surface so that prior to and during launch the thermal insulation is a relatively poor heat insulator whereby there is the safety factor previously mentioned in the event of an abort.

In addition to the above-mentioned safety factor, it is desirable as a matter of convenience that a thermoelectric generator have the characteristics that it can be put into operation (thus bringing some of the foil layers to a high temperature) in the atmosphere without damaging it because, if the generator is in a spacecraft that is to be shot into space, for example, it is not a simple matter to have the generator in a vacuum or otherwise removed from the atmosphere while the spacecraft is on the ground. After it is shot into space it is in a vacuum and any oxide or corrosion on a suitably selected foil disappears.

The invention will be described in detail with reference to the accompanying drawing in which:

FIG. 11 is a view showing a gas valve control that may be used with the embodiment illustrated in FIG. 9.

In the several figures like parts are indicated by similar reference characters.

Figures 1, 2, 3, 4:
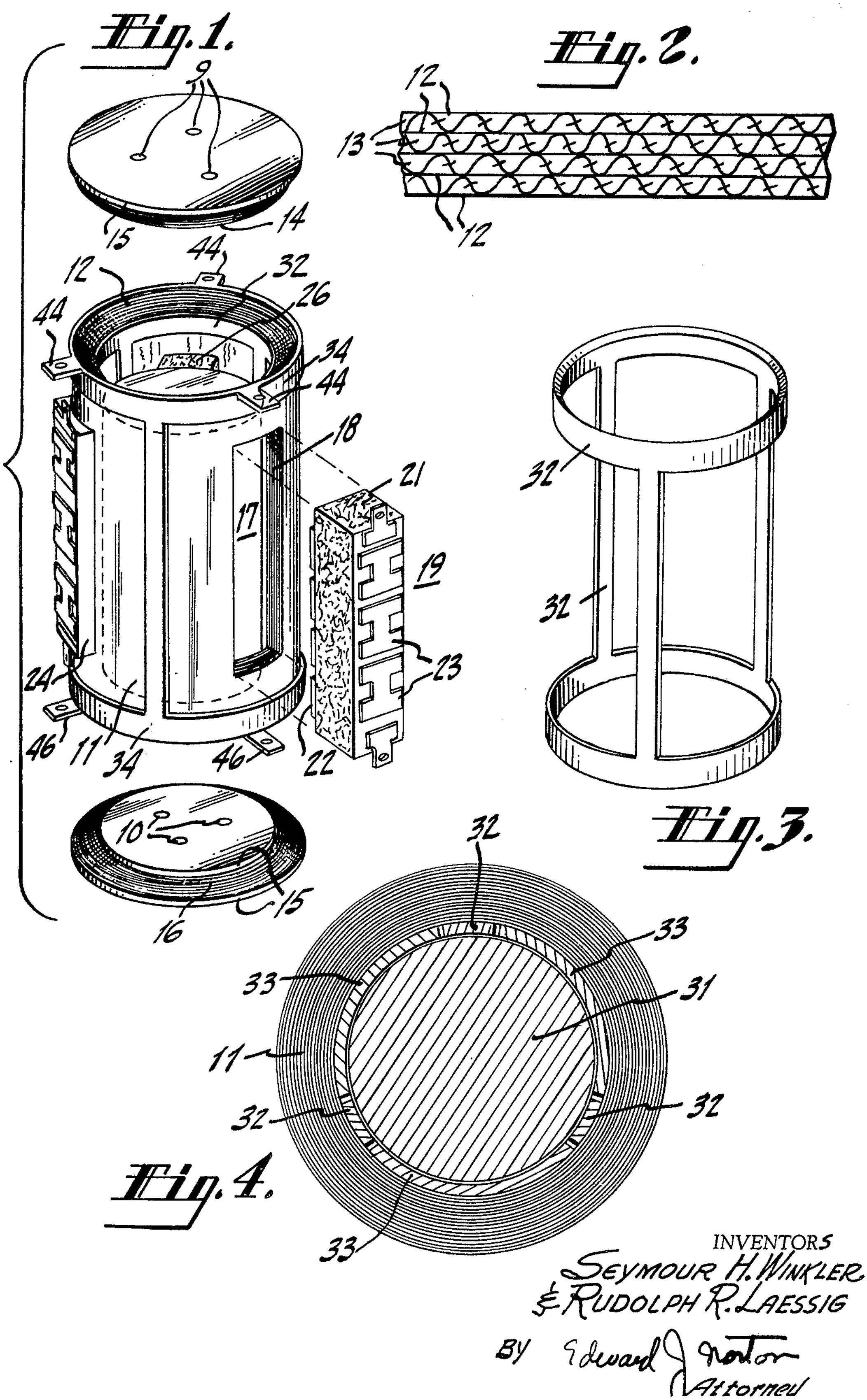
FIG. 1 is a partially exploded view illustrating in simplified form an example of a thermoelectric generator embodying the invention.
FIG. 2 is a simplified cross-section diagram that is referred to in describing our improved multiple-foil thermal insulation.
FIG. 3 is a view of the inner cage support for the cylinder of thermal insulation included in the view of FIG. 1.
FIG. 4 is a cross-sectional view of the cylinder of thermal insulation, the inner cage support, and mandrel pieces employed in the process of forming the cylinder of thermal insulation.

Referring to FIG. 1, our thermoelectric generator comprises a chamber formed by our improved multiple-foil thermal insulation. In this example, the chamber is in the form of a cylinder 11. The wall of the cylinder consists of spaced layers of metal foil 12, the metal selected to have the characteristics previously indicated and described hereinafter.

The metal foil layers are spaced apart and supported by filler material such as a silica-alumina paper felt 13 as shown in FIG. 2 where the multiple-foil thermal insulation is illustrated generally. In the example being described, the foil is rhodium foil approximately one thousandths of an inch thick, there being twenty-six layers of this foil, and the paper felt is approximately ten thousandths of an inch thick. The cylinder may be formed by winding the metal foil and the paper felt over a mandrel as described hereinafter.

The ends of the cylinder 11 are chamfered, cut at 45 degrees for example. These ends are closed by flat disk-shaped members 14 and 16, which are chamfered to fit into the ends of the cylinder. These flat members are also constructed as multiple-foil thermal insulation the same as the cylinder 11, and contain the same number of layers of foil. The chamfering and the fitting for closing the ends of the cylinder are done accurately enough so that, preferably, foil layer number 1 of the cylinder is adjacent to foil layer number 1 of the flat disks, so that foil layer number 1 of the cylinder is not adjacent to foil layers number 2 or number 3, for example, of the flat disks. The inner foil layer is referred to as foil layer number 1.

The thermal insulating disks 14 and 16 have holes 9 and 10, respectively, passing through them. Ceramic tubes (not shown) pass through these holes for supporting purposes as described hereinafter. Each of the thermal insulating disks 14 and 16 is sandwiched between thin disks 15 of heat resistant metal and sewn to the metal disks by means of fine wires of heat resisting metal, such as platinum, or ceramic threads, to hold the foil layers in place. The inner disks 15 may be of Hastelloy-X and the outer disks 15 of stainless steel. Hastelloy-X is manufactured by the Haynes-Stellite Co., Kokomo, Ind.

The heat source inside the chamber is indicated at 17. In the present example it comprises a cylindrical capsule (indicated at 17) which contains a supply of strontium-90.

The thermocouples are positioned in rectangular openings cut into the cylinder 11. In the present example there are three of these openings spaced 120 degrees apart around the cylinder. One of these openings is shown at 18.

The energy conversion devices employed in this example are silicon-germanium thermocouples. These thermocouples have the desirable feature that they can be operated with a high hot-junction temperature such as between 800 and 1000 degrees centigrade and above. Therefore, they can be operated at a reasonable efficiency without having to maintain the cold-junction temperature at such a low temperature that, in the case of use in a satellite, a large radiator would be required. For example, the cold-junction temperature may be about 250 degrees C. and need not be held to a temperature as low as about 150 degrees centigrade as would be required for efficient operation of a lead telluride thermocouple which has a hot-junction temperature restricted to approximately 600 degrees centigrade. Suitable silicon-germanium thermocouples are known in the art. For example see the article by Dismukes et al. entitled "Thermal and Electrical Properties of Heavily Doped Ge-Si Alloys up to 1300° K." in the Journal of Applied Physics, July–December 1964, vol. 35, page 2899. In this article there is described a thermocouple comprising p-type $Ge_{0.15}$—$Si_{0.85}$ doped with boron and n-type $Ge_{0.15}$—$Si_{0.85}$ doped with phosphorus.

Figures 5, 6:
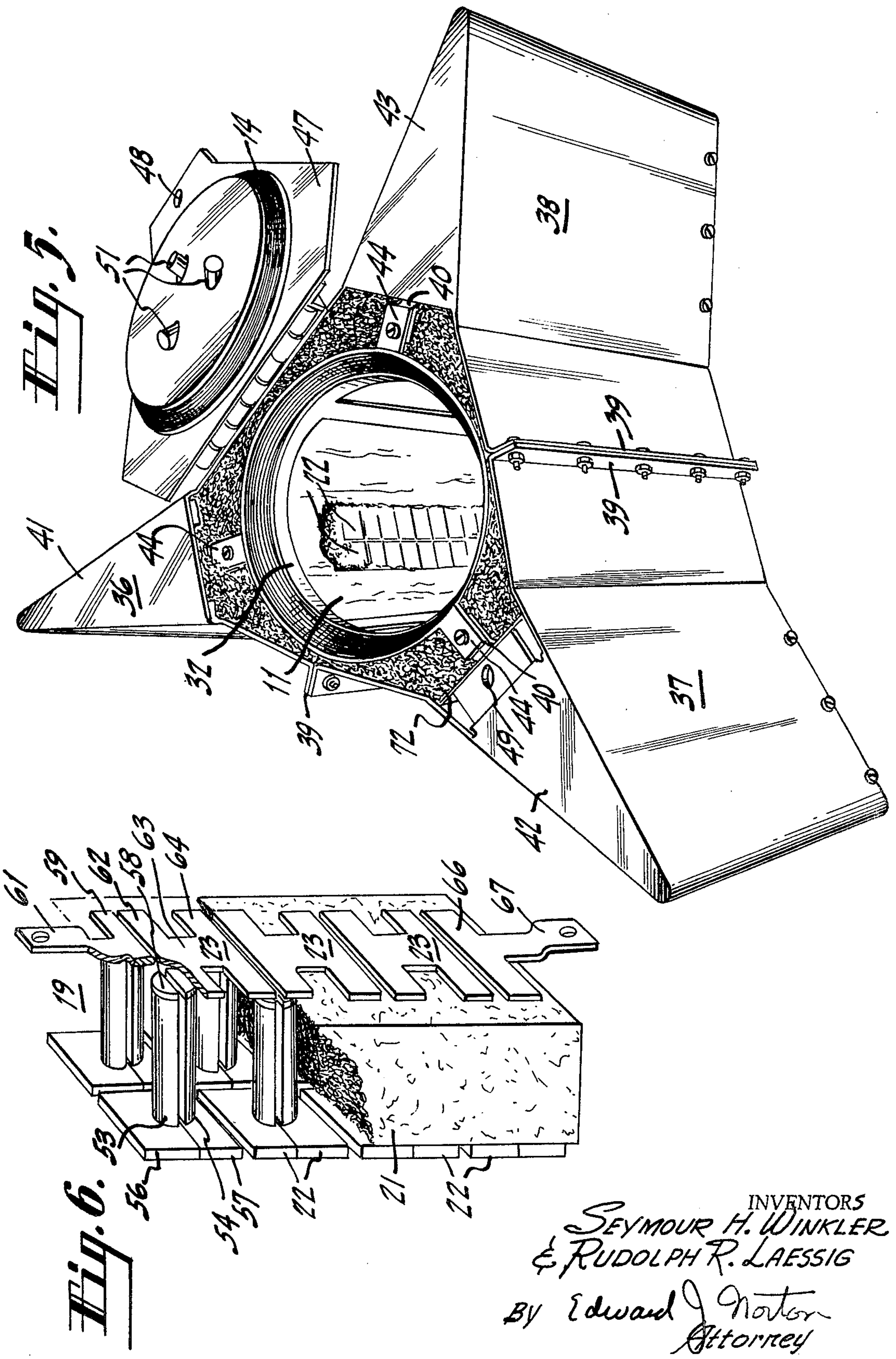
FIG. 5 is a view in perspective of the thermoelectric generator, including the radiators, but with the fuel capsule removed.
FIG. 6 is a view of one bank or module of thermocouples includes in the thermoelectric generator shown in FIGS. 1 and 5.
Figure 7:
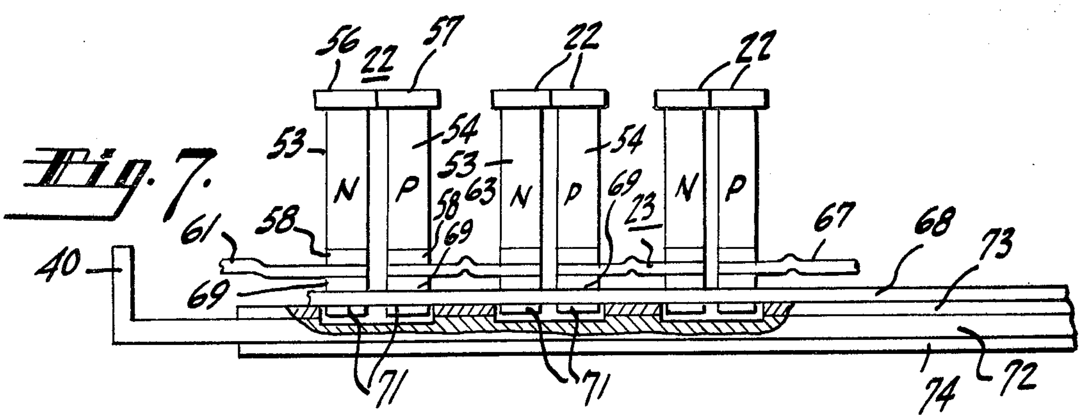
FIG. 7 is a side view, partly in section, of the thermocouples shown in FIG. 6, together with a showing of the structure for carrying heat from the cold-junctions to the radiator.

A bank of thermocouples 19, which are set into the opening 18, are self-supporting and packed with fiber heat insulation 21 that will withstand the high temperature. The thermocouple hot shoes are indicated at 22. Thermocouple electrical-interconnecting copper straps at the thermocouple cold ends are indicated at 23. Details of this bank of thermocouples are shown in FIGS. 6 and 7 which are later described.

A similar bank of thermocouples, indicated at 24, is set in the second rectangular opening in the cylinder 11, and is illustrated as set in operating position. The top of the third bank of thermocouples which is set in the third rectangular opening in the cylinder 11 is indicated at 26.

The mechanism of the insulation of our thermal insulation is that of the Dewar flask. It relies on multiple reflective surfaces, preferably in a vacuum to minimize heat transfer. It is, therefore, necessary that the reflective foils be separated to minimize conductive contact. In the example that has been described this separation is provided by a silica-alumina paper felt known as Fibrefrax manufactured by the Carborundum Co., iagara Falls, N.Y. Pure silica felt or open weave cloth, or other ceramic papers or cloths may be used providing they have a suitably high melting point and have general dimensional integrity.

It is also possible to eliminate these filler materials entirely and perform the foil separation for minimizing conductive contact between metallic foils by embossing or by crinkling alternate layers of foil or providing regularly spaced straight-line folds at right angles in alternate layers, thus providing only point contact from foil layer to foil layer.

The use of a paper or cloth filler material is advantageous because it has good tensile strength and is produced and supplied in long continuous rolls. Therefore, it can serve as the tensioned carrier for the metal foil in the process of winding a cylinder of the thermal insulation on a mandrel. The metallic foil may be in small sheets instead of in a continuous roll. In the structure illustrated in FIGS. 1, 3 and 4 the rhodium foil is in sheets about eighteen inches long. These sheets are placed on the paper felt held under tension, and the paper felt and foil wound over a mandrel into the twenty-six layer hollow-cylinder 11 which is approximately four inches inside diameter and nine inches long. This twenty-six layer insulation is approximately 0.37 inch in thickness.

The mandrel over which the paper felt and foil layers is wound is illustrated in FIG. 4. The mandrel is a cylinder 31 mounted for rotation. An inner supporting cage 32 (see FIGS. 1 and 3 also) of a metal such as Hastelloy-X that can withstand the subsequent environmental conditions of the thermoelectric generator operation is slipped over the mandrel 31. Three bent sheets 33 conforming to the surface of the mandrel are then placed on the mandrel to fill in the spaces between the legs and end rings of the cage 32 so that there is a smooth unbroken surface over which to wind the thermal insulation layers.

The paper felt with the sheets of metallic foil are wrapped in continuous fashion around the mandrel until the desired number of layers are built up (twenty-six layers in this example), the paper felt and foil are cut off and a split sheet metal clamp ring 34 (FIG. 1) is placed at each extreme end of the hollow cylinder and tightened to clamp the insulation layers between the the clamp ring and the end rings of the inner cage 31, thus holding the layers in place. In the example illustrated, the clamp rings 34 are the end rings of a cage similar to the inner supporting cage 32, but with the end rings split for clamping purposes. This outer cage 34 may be made of stainless steel.

The cylinder 11 of thermal insulation is now pulled off the mandrel 31 together with the supporting cage 32 and the bent sheet 33. The sheets 33 drop away, leaving the cage 32 as the inner support for the cylinder of insulation.

The inner cage 32 and the clamp rings of the outer cage provide the required rigidity to permit the assembly to be placed on a rotary table for machining the accurate chamfer required at each end of the cylinder. This machining is accomplished by a flat razor-type blade of acute angle ("X–Acto" type blade), which is placed in a reciprocating saber-saw which in turn is affixed to a stationary support such as the arbor of a milling machine when the rotary table is on the milling machine's table. In order to cut the rectangular openings corresponding to opening 18, a similar procedure is used in which the milling machine's table movement is used to produce accurate opening dimensions.

The cylinder end closure disks 14 and 16 are formed with the holes passing through them at forty-five degrees and with the periphery chamfered at forty-five degrees as follows. In order to drill the holes without tearing, the twenty-six layers of rhodium foil were built up with metallic shims substituted for the ceramic paper. The shims were equal in thickness to the compressed paper thickness, i.e., to the thickness of the paper in the cylinder 11. The holes are then drilled and the periphery chamfered by using a conventional drill and a conventional engine lathe, respectively.

The ceramic paper, to be used for the rhodium foil separation, is stacked with ordinary paper in alternate layers, the ordinary paper substituting for the rhodium foil. The angled holes are cut using an alignment fixture and a hollow tube with a sharpened and serrated edge. The periphery is chamfered at forty-five degrees by using an oscillating blade guided by the fixture.

The complete end closure disks 14 and 16 are then assembled by alternately stacking the pre-cut rhodium foil and the pre-cut disks of ceramic paper and then sewing the stacked pack together (with the proper compression value) between metal disks 15 with platinum wire.

The Fibrefrax used as the paper felt in this embodiment contains an organic binder that give strength to the ceramic paper. After the thermal insulating cylinder has been cut on the milling machine and the end closure disks have been assembled, the thermal insulation is heated to about 897 degrees centigrade for fifteen minutes in a vacuum furnace at a pressure of about $5\times10^{-3}$ millimeters of mercury to remove the binder. Some carbon remains which is removed by next heating the cylinder and end closure disks to about 400 degrees centigrade in hydrogen. The removal of the binder results in volumetric shrinkage of the paper felt. This relaxes the compressive forces between the layers of the multiple-foil insulation so that its heat insulating quality is improved, there being less heat conductive coupling between the metal foil layers.

Figure 8:
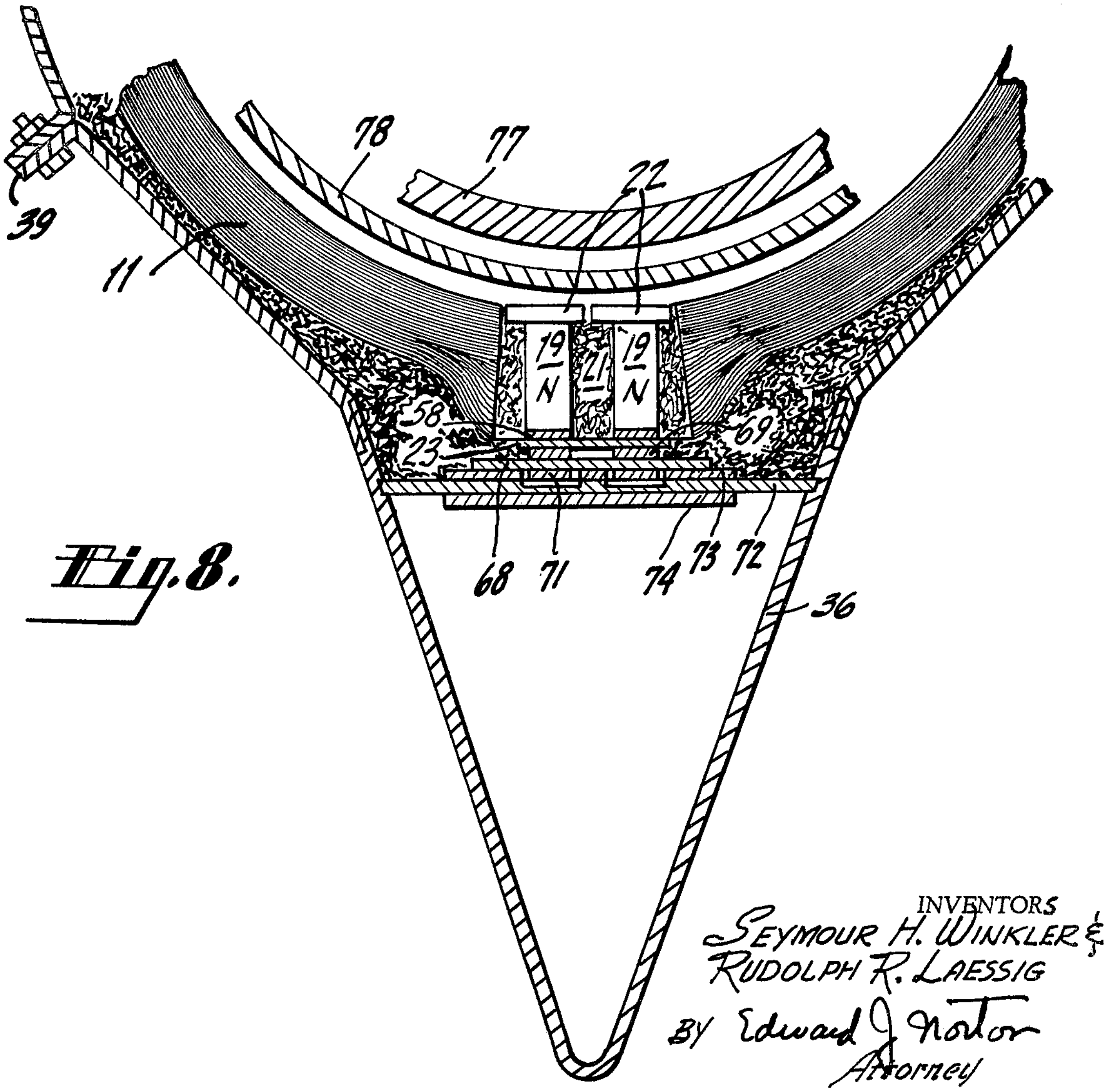
FIG. 8 is a sectional view of FIG. 9, showing in more detail certain features of the invention.

FIG. 5 is a view of the thermoelectric generator with the fuel capsule 17 (FIG. 1) removed, and with the upper end of the thermal insulation cylinder 11 open. The hot shoes of the bank of thermocouples 19 are shown at 22. The generator includes three radiators 36, 37 and 38. Each radiator comprises two aluminum sheets which are joined at the outer end, and which spread toward each thermocouple bank. Each thermocouple bank is supported by its associated radiator, and the cold-junctions of the thermocouples are connected to the radiators for good heat conduction. This supporting and heat conduction structure is shown in FIG. 8 described hereinafter.

The three radiators are snugly fitted around the thermal insulating cylinder 11 and held in position by flanges 39 on the radiators which are bolted together.

The top and bottom of the radiators are closed by triangular aluminum sheets which are brazed in place. In FIG. 5 the three upper triangular sheets are shown at 41, 42 and 43. As shown more in detail in FIGS. 7 and 8, each radiator has a heat conducting aluminum sheet 72 brazed to it which has a lug 40 extending from it for more firmly supporting the thermal insulating cylinder 11. This support is effected at the upper end by lugs 44 (FIGS. 1 and 5) extending from the upper ring of the outer supporting cage 34. The lugs 40 and 44 are bolted or screwed together.

The lower end of the thermal insulating cylinder 11 is similarly supported by means of lugs 46 (FIG. 1) extending from the lower ring of the outer supporting cage 34 which are bolted or screwed to lugs (not shown) extending from the aluminum sheets 72.

The radiators should have a high emissivity for heat waves, and also should have low absorptivity in the visible region so that the generator does not absorb appreciable solar heat. These radiator characteristics are obtained by covering the radiators with a flat white paint.

The disk 14 of thermal insulation is supported on a cover plate 47 which is hinged to the upper edges of the radiators 36 and 38. When the cover plate 47 is swung into closed position (after the fuel capsule has been inserted), the disk 14 fits accurately into the top of the cylinder 11 as previously described. The cover plate 47 is held in its closed position by a quarter-turn screw 50 (FIG. 9) that passes through a hole 48 in the cover plate and into a hole 49 in the radiator 37.

The thermal insulation disk 14 is secured to the cover plate 47 by three ceramic tubes 51 which pass through the holes 9 (FIG. 1) in the disk 14 and into holes in a thick aluminum disk 52 (FIG. 9) to which they are bonded. The aluminum disk 52 is bolted or otherwise affixed to the cover plate 47. The tubes 51 hold the insulation disk 14 in place because the holes 9 are cut at an acute angle through the disk 14, at forty-five degrees in this example.

Figure 9:
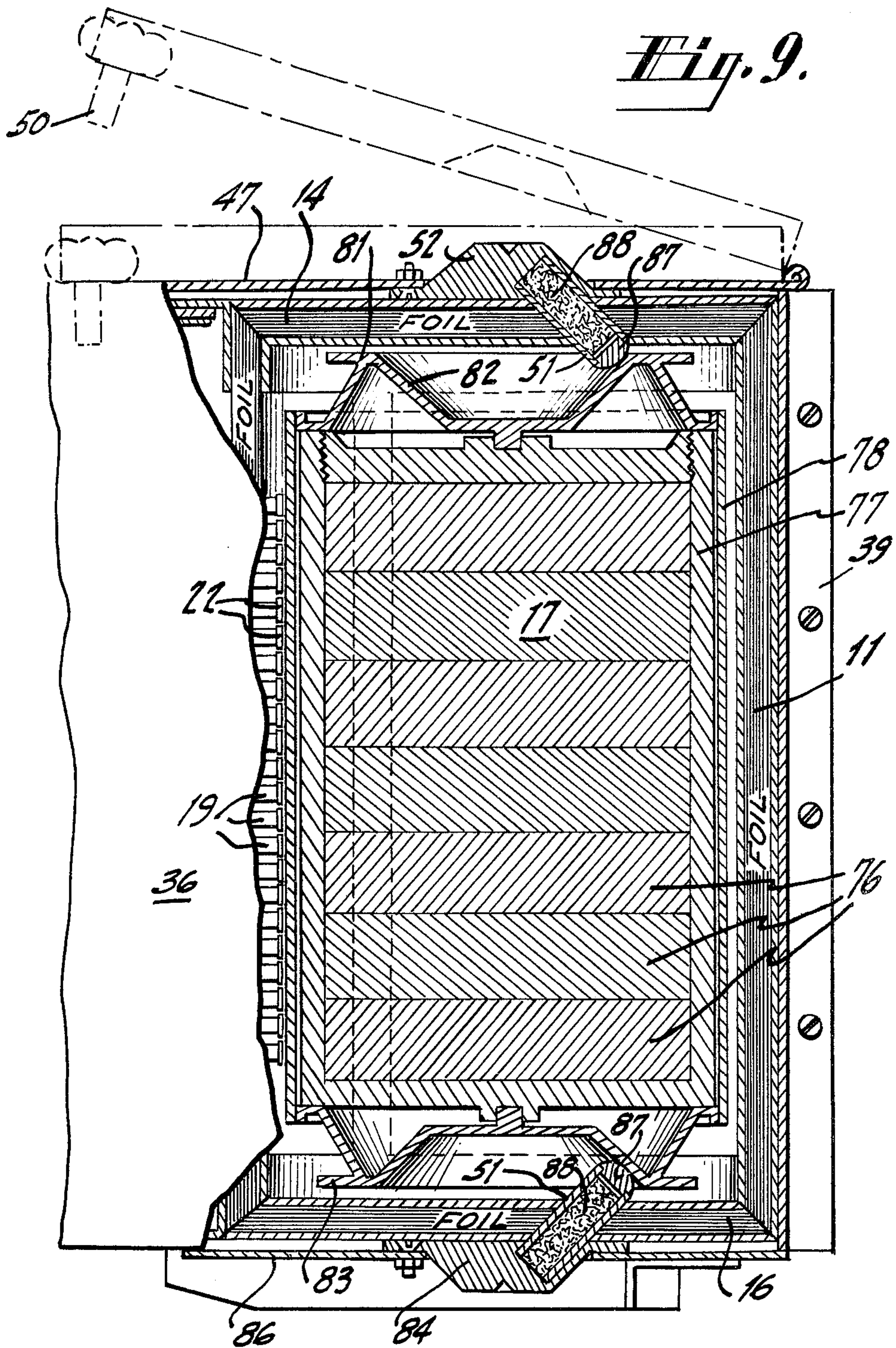
FIG. 9 is a view, partly in section, of the thermoelectric generator showing certain details including the supporting means for the fuel capsule.

After the fuel capsule 17 is inserted and the cover plate 47 is closed, the ceramic tubes 51, together with similar ceramic tubes at the bottom, hold the fuel capsule in position as is illustrated in FIG. 9 which is described later.

The banks of thermocouples, the way they are supported by the radiators, and other details will now be described. Refer to FIGS. 6 and 7. A double row of only four thermocouples in each row is shown in FIG. 6 to simplify the drawing. In the generator shown in FIG. 5, there are eleven thermocouples in each row. In this specific example, each thermocouple comprises two legs 53 and 54 of silicon-germanium alloy, one leg being N doped and the other being P doped. Each leg is semi-circular in cross section. At the hot-junction the Si-Ge leg 53 has a hot shoe 56 integral therewith of brazed to it. Similarly the leg 54 has a hot shoe 57. The two hot shoes are electrically and mechanically connected together by brazing. In this example the hot shoes are of the same Si-Ge alloy as the Si-Ge rods 53 and 54. The other thermocouples are like the one just described and have their hot shoes indicated generally by 22.

At the cold-junction of the thermocouples each Si-Ge leg has a cold shoe 58 brazed to it. This is a semi-circular disk of tungsten which has been nickel plated to facilitate brazing.

In the illustrated example the thermocouples are electrically connected in series-parallel. They could, instead have been connected in series or in parallel. As shown in FIG. 6, the N doped legs of the first thermocouples in the two rows are connected together by a copper interconnecting strip 59, (partly broken away) having an electrical output terminal connection 61. The P doped legs of these two thermocouples are connected together by a copper strip 62 (partly broken away). The strip 62 is connected by a cross strip 63 to a strip 64 which connects together the N doped legs of the next pair of thermocouples. The strips 62, 63 and 64 are an integral piece of copper which is nickel plated to facilitate brazing. The connections are continued as above described by the interconnecting copper strips indicated generally at 23. The final interconnecting strip shown at 66 connects the P doped legs in the last thermocouples in the two rows, and connects to an electrical output terminal 67. All the interconnecting strips are nickel plated and brazed to the cold shoes 58. This provides a solid self-supporting bank of thermocouples. In the example here illustrated the bank of thermocouples is packed with thermal insulating fibers 21 to minimize heat loss through the spaces in the thermocouple bank. In this example the packing is with a mixture of aluminum oxide and silicon dioxide fibers sold under the trademark Kaowool, and manufactured by Babcock and Wilcox, New York, N.Y.

Referring now more particularly to FIG. 7, part of which is a side view of FIG. 6, the cross strips 63 are shown with a bend in them to allow for thermal expansion, this bend not being shown in FIG. 6. FIG. 7 shows how the cold-junctions are connected to the radiators for holding down their temperature. The inter-connecting copper strips of the cold junctions rest against a copper base plate 68, with aluminum oxide disks 69 intervening to prevent short-circuiting by the copper base plate. The two faces of the disks 69 are metalized with nickel, and their faces are brazed to the copper interconnecting straps 23 and to the copper base plate 68.

In order to reduce the thermal expansion of the copper base plate 68 immediately under thermocouples, tungsten semi-circular disks 71, after being nickel plated, are brazed to the underside of the base plate 68 immediately below each thermocouple leg.

The copper baseplate 68 is soldered and bolted to a metal sandwich including a sheet of nickel plated aluminum 72 which carries heat from the cold-junctions to one of the radiators. The sheet 72 is sandwiched between sheets 73 and 74 of nickel which are soldered to each side of it so that the thermal expansion of the sandwich is about the same as that of the copper base plate 68. This structure is shown in section in FIG. 8. A recessed portion is provided in the sandwich surface facing the cold-junctions for receiving the tungsten elements 71 so that the copper base plate 68 fits snugly against the nickel sheet 73 of the sandwich.

As shown in FIG. 8, the aluminum sheet 72 of the sandwich is brazed at each end to the aluminum radiator 36. Thus, heat is conducted from the cold-junctions to the radiator 36 which radiates the heat.

Referring to FIG. 8, the bank of thermocouples 19 is shown set in a rectangular opening in the thermal insulation cylinder 11 as previously described. In this example, the length of the thermocouples is greater than the thickness of the cylinder of insulation. Therefore, the layers of metal foil of the insulation are spread to make the thickness of the multiple-foil insulation that is adjacent to the thermocouples substantially the same as the length of the thermocouples. The foil layers are also spread so that at the thermal insulation adjacent to the thermocouples its isotherms match the thermocouple isotherms.

All the open space in the bank of thermocouples and the space between the multiple-foil insulation and the thermocouples is packed with thermal insulating fibers 21 such as Kaowool previously mentioned.

A preferred sequence of assembly for the above-described structure will now be described. First, the radiator structure includes the aluminum sheet 72 brazed to it, with the nickel sheets 73 and 74 on each side of it. That is, initially the sheet 72 is brazed to the radiator (radiator 36, FIG. 8, for example), but the copper base plate 68 of the thermocouple bank is not yet soldered to the sandwich 73, 72, 74. The thermocouple bank is then mounted on the aluminum sheet 72 by soldering and bolting the copper base plate 68 to the nickel sheet 73. Either before or after this mounting of the thermocouple bank, the thermocouples are hand packed with Kaowool. The radiator, now carrying the thermocouple bank, is moved toward the thermal insulation cylinder 11 so as to move the thermocouple bank into the rectangular opening in the cylinder 11. The Kaowool has been packed so that there is about 1/16 inch clearance between the Kaowool packed thermocouple bank and the edges of the rectangular opening.

After the three thermocouple banks have been thus positioned in the openings of the cylinder 11, and the three radiators bolted together as indicated at 39, the 1/16 inch clearance is packed with Kaowool, working from inside the cylinder 11.

Additional Kaowool insulation may be packed in the space between the cylinder 11 and the radiators as indicated in FIGS. 5 and 8. This additional insulation is not necessary thermally, but it serves to give some vibration damping.

As shown in FIGS. 8 and 9, the fuel capsule 17 is a double-wall cylindrical container in which the fuel is located. In this example the fuel is strontium-90 which has been converted into the stable and inert compound strontium titanate ($SrTiO_3$). The fuel pellets, which are in the form of flat disks, are indicated in FIG. 9 at 76, seven pellets being used in this example.

In this example, the inner container 77 (the inner wall of 17) is made of a molybdenum alloy, referred to as TZM, in which the molybdenum contains 0.5 percent titanium and 0.08 percent zirconium. The outer container 78 (the outer wall of 17) is made of Hastelloy-X. The ends of the capsule 17 are double-walled and of the same materials as the cylindrical walls, respectively, of the capsule.

An inert gas such as helium or argon, or a mixture of them, is between the two container walls, and also in the inner container with the fuel pellets. This gas aids in the welding required to weld the capsule 17 closed after the fuel pellets have been dropped into it. Also, the gas provides some heat conduction, although the heat from the fuel pellets reaches the hot shoes of the thermocouples mostly by radiation. The fuel pellet insertion and the capsule welding are done in an evacuated hot cell by remote handling equipment. The outer wall 78 and its ends of Hastelloy-X welded thereto prevent air from reaching the inner wall 77 of TZM which would oxidize to destruction quickly if it were at a temperature as high as about 650 degrees C. in air.

Figure 10:
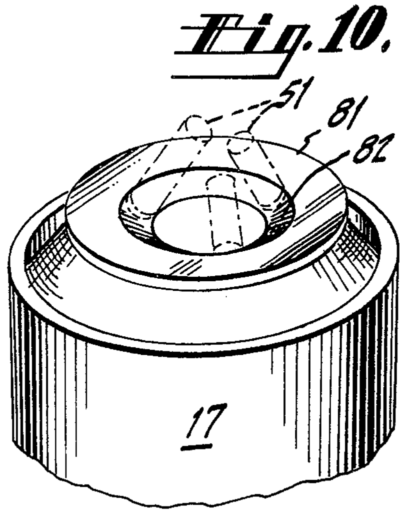
FIG. 10 is a view showing one end of the fuel capsule in perspective.

It has previously been stated that the capsule 17 is supported by ceramic tubes 51. This supporting structure will now be more specifically described with reference to FIGS. 9 and 10. As shown in these figures, a disk 81 of metal that will withstand the high temperature, Hastelloy-X in this example, is welded to the top of the outer wall 78. It has a conical recess with the side 82 having an angle of forty-five degrees to the vertical. When the hinged cover plate 47 is closed, the ends of the ceramic tube supports 51 make contact at ninety degrees with the side of the conical recess to hold the capsule in position.

At the bottom of the capsule 17 there is a similar disk 83 of metal having a conical recess, which is welded to the bottom of the outer wall 78. The sides of the conical recess rest against three ceramic supporting tubes 51 which are set into and bonded to a thick aluminum disk 84. Thus, the bottom of capsule 17 is held in position. It will be noted that the ceramic tubes 51, which are bonded to disk 84, support the multiple-foil insulation disk 16, and that the assembly of disk 84, tubes 51 and insulation disk 16 are supported by a cover plate 86 which is bolted or otherwise fastened to the radiators.

Referring in more detail to the ceramic supporting tubes 51, the ceramic tubes may be of a zirconium oxide ceramic, for example. A sapphire contact button 87 is located on the end of the ceramic tube for making contact with the side of the conical recess in each of the capsule supporting disks 81 and 83. The sapphire button is used because otherwise the ceramic tube might weld to the capsule supporting disk. The ceramic tube is filled with thermal insulation material 88 such as the silica fiber product known under the trade name Min K, and manufactured by the Johns-Manville Company, Manville, N.J.

Figure 11:
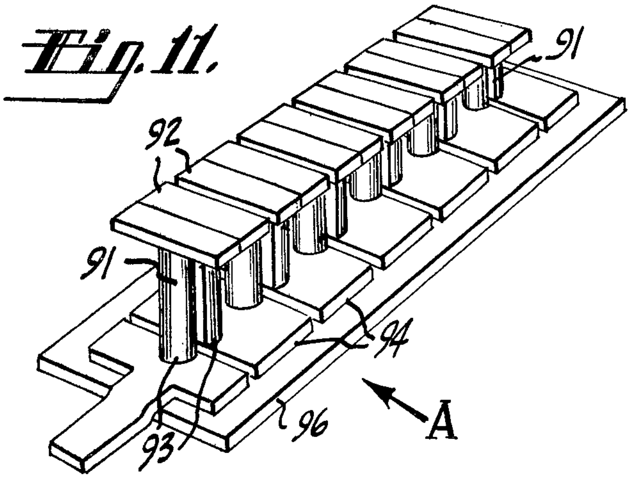
FIG. 11 is a view showing a single row of thermocouples.
Figures 12, 13:
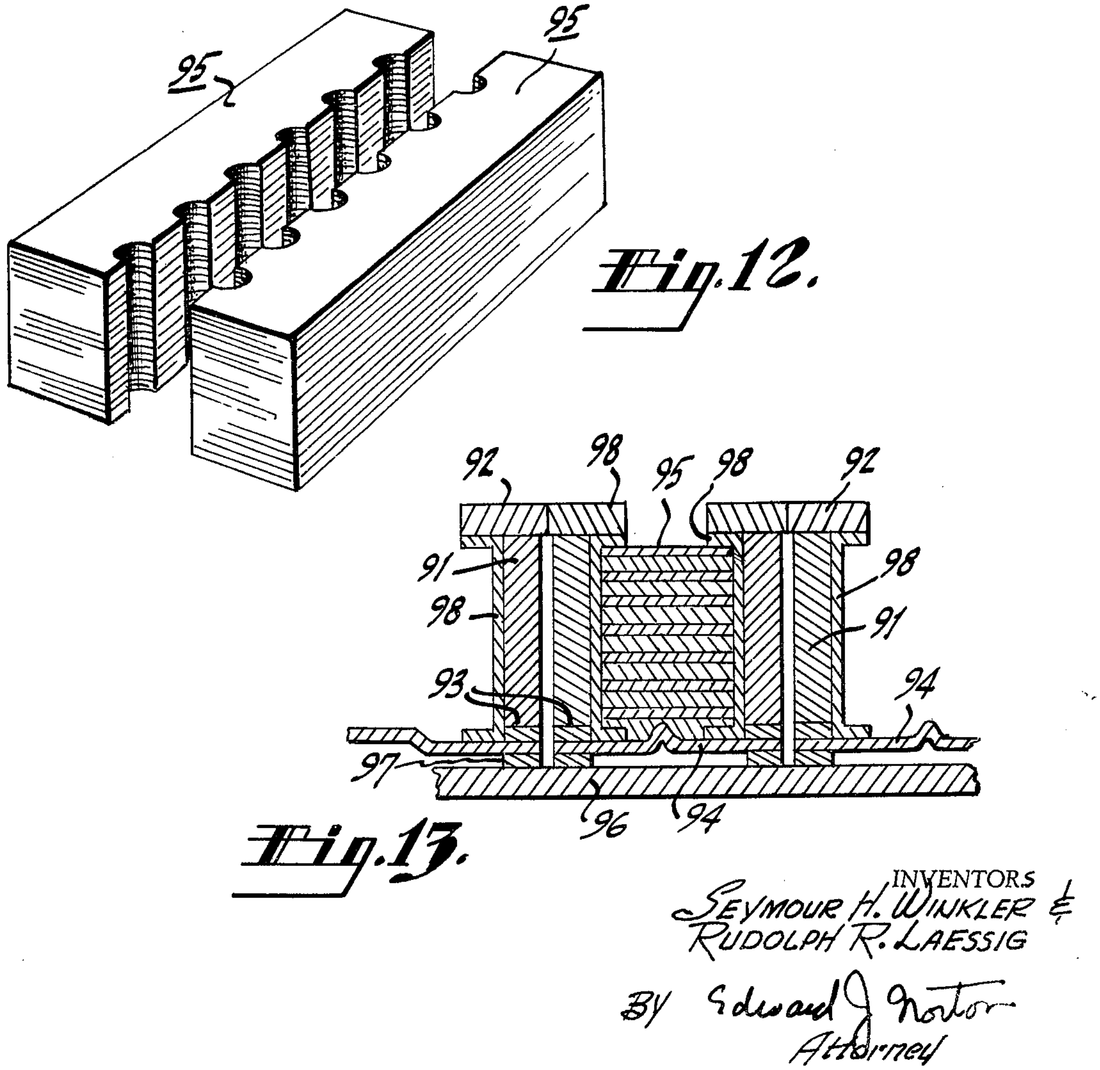
FIG. 12 is a view of multiple-foil thermal insulation cut to fit on each side of the thermocouples of FIG. 11 so as to prevent undue heat leakage through the bank of thermocouples.
FIG. 13 is a cross-sectional view of two of the thermocouples of FIG. 11 with the thermal insulation of FIG. 14 in place, looking in the general direction of the arrow A.

In the above-described embodiment, heat loss through the bank of thermocouples is minimized by packing Kaowool around the thermocouples. Another way of minimizing this heat loss is to employ our multiple-foil insulation cut to fit around the thermocouples. Refer to FIGS. 11, 12 and 13. FIG. 11 illustrates a single row bank of thermocouples 91, each having hot shoes 92 and cold shoes 93. The copper connector strips 94 are electrically insulated from the copper base plate 96 by means of aluminum oxide disks or strips 97 (FIG. 13).

Multiple-foil thermal insulation 95, which is the same as that forming the cylinder 11, is cut as shown in FIG. 12 so that it may be fitted closely against each side of the row of thermocouples 91. This close fitting of the multiple-foil insulation is illustrated in FIG. 13 which is a partial section of FIG. 11 looking in the general direction of the arrow A. In order to prevent the metal foil layers of the insulation from making contact with the thermocouples and shorting, ceramic bushings 98 (or a coating of a ceramic) surround each SiGe leg of the couple.

As has been described, our thermoelectric generator requires multiple-foil thermal insulation in which the metal foil on the hot side of the insulation has the following characteristics:

(1) The metal foil must not melt at the high temperature to which it will be heated by the generator's heat source. Also, the metal foil must not disintegrate when heated in the atmosphere. In the specific generator described the foil must withstand a temperature at least as high as about 1060 degrees centigrade.

(2) The metal must be one that can be rolled or otherwise formed into a thin foil, or it must be one that can be plated or coated on a substrate foil that will withstand the high temperature.

(3) The foil should be highly reflective of infrared radiation, i.e., of waves having wavelengths in the region from about 0.8 micron to about 15 or 20 microns. The average reflectivity of an individual foil surface to such waves should be at least 80 percent over the above wavelength region.

(4) The foil must be of a metal that oxidizes or corrodes slowly and only slightly and is not destroyed when heated to a high temperature, such as 500 or 800 degrees centigrade, in the atmosphere; and the oxide or corrosion that results must have the characteristic that when it is placed in a vacuum most of the oxide or corrosion will evaporate or disappear in a reasonable time. This is necessary to bring the metal foil back to the required high infrared reflectivity, the oxidized or corroded metal having comparatively poor reflectivity, such as approximately 50% or less, for infrared radiation.

(5) Where the above-discussed safety factor is desired, as in the case of satellites, for example, the oxide or corrosion that is formed on the foil in the atmosphere should be relatively stable in the atmosphere so that the foil reflectivity remains low until after the foil is in its space vacuum environment.

Rhodium is the metal used in the above described generator, and it has the above five characteristics. It has a melting point of about 1927 degrees C. The invention is not limited to the use of rhodium. Studies indicate that certain other metals Group VIII, Fifth and Sixth period of the Periodic Table may be used as the metal foil for the multiple-foil thermal insulation. For example, platinum and iridium both have the above five characteristics. Like rhodium, they will withstand temperatures above 1500 degrees C. They can be rolled into a foil. The individual surface of a platinum or iridium foil has an average reflectivity to infrared radiation that is at least 80 percent over the 0.8 to 15 micron region. At high temperatures such as from 500 degrees C. to 900 degrees C. in the atmosphere they, like rhodium, oxidize or corrode slowly and to only a slight extent, and this oxidization or corrosion which greatly reduces the reflectivity will evaporate or disappear when the surrounding region becomes a vacuum, thus restoring the high reflectivity. The oxide or corrosion that forms is relatively stable in the atmosphere so that it remains on the foil until it is placed in a vacuum.

With respect to the oxidation deoxidation of a suitable metal foil and the corresponding emissivity or reflectivity, the following is given by way of example. Nonoxidized (noncorroded) rhodium foil with an emissivity of 0.05 and a reflectivity of 0.95 was heated in the atmosphere and held at a temperature of 500 degrees C. for several hours. It was then found to be oxidized or corroded and to have an emissivity of 0.57. This is a reflectivity of 0.43. It is believed that there is substantial corrosion in less than an hour with resulting reduction in reflectivity.

This corroded rhodium foil was then placed in a vacuum of about $10^{-6}$ torr, heated to a temperature of 500 degrees C., and held at this temperature in the vacuum for about five days. The foil was then allowed to cool, removed from the vacuum, and its emissivity determined. Its emissivity returned to its original value of 0.05. This is a reflectivity of 0.95.

The emissivity and reflectivity values given are for infrared radiation. Tests were made and emissivity and reflectivity values were determined as follows:

On a "Perkin-Elmer Model 112 U" Spectrophotometer, the foil was first determined to be opaque to radiation from 0.3 to 20 microns in wavelength, i.e. spectral transmissivity was zero across the band. Next, a "Gier-Dunkle" reflectivity attachment was added and used with each foil sample to determine the sample's spectral reflectivity between upper and lower wavelength extremes selected to include 98% of the energy in the Planckian "black-body" energy distribution for the operating temperature of interest for each foil. Each foil was measured at four angles of incidence between normal and parallel, selected to give a direct computation of hemispherical reflectivity. Each foil was measured before oxidation, after oxidation at one temperature between 300° C. and 1200° C., and then after several days of $10^{-6}$ torr vacuum exposure at at least two temperatures each: its oxidation temperature and a temperature one hundred degrees centigrade above its oxidation temperature.

Each measurement consisted of a plot of reflectivity versus wavelength; this was then integrated and averaged over the proper black-body spectrum to give a single value of average reflectivity. For opaque material, the average emissivity is calculated equal to unity minus the average reflectivity.

The coating that forms on rhodium, platinum, and iridium when heated in the atmosphere is thought to be one or more oxides, but it is a corrosion of some kind that reduces the infrared reflectivity of the metal. Also, in some manner, which we refer to as evaporation, this corrosion begins to disappear (without requiring that the metal temperature be raised above its oxidation temperature) when the corroded metal is placed in a vacuum.

A description will now be given of the temperatures that may be expected from the time the fueled heat source is inserted into the thermoelectric generator (which is in a satellite on a launch pad) until such time after launch of the satellite that the generator has reached equilibrium conditions in space.

If the metal foil layers of the multiple-foil insulation did not oxidize or corrode, the temperature achieved in air at the hottest foil layer after installation of the heat source, would be approximately 800 degrees C. The outside of the fuel capsule would be at approximately this same temperature, a temperature high enough to weaken the fuel capsule an undesirable amount.

Actually, the foil layers (rhodium) do corrode while the satellite is on the launch pad (thus increasing their emissivity and decreasing their reflectivity) so that the multiple-foil assembly is a relatively poor heat insulator. As a result, the hottest foil layer temperature is approximately 600 degrees C., and the coldest foil layer temperature is about 200 degrees C.

It has been established that there is significant oxidation or corrosion of the rhodium foil at temperatures of 500 degrees C. and over, sufficient oxidation or corrosion to reduce the reflectivity for infared radiation from above 90 percent to below 50 percent, for example.

The temperature distributions of the foil layers starting with the hottest down to the coldest foil layer is such that there is a very small temperature drop from foil to foil in the first (hottest) foils, with the gradient slowly increasing to a steep value only at the last few foils. Therefore, many of the foils will be above 500 degrees C., will be oxidized or corroded and will have emissivities 6 to 10 times their uncorroded values. Since the corrosion of the rhodium is not progressive in its action after the initial corrosion is formed, the emissivities will remain at their high values with no substantial change to the foil indefinitely as long as the generator is in air.

From the time that the spacecraft is launched, the atmosphere surrounding the generator starts to lose pressure and density. Within ten to fifteen minutes the environment is fairly hard vacuum. The time for the internal volume of the generator to reach a hard vacuum will depend upon the number and size of openings which permit the leakage to space. Since the ambient vacuum will be in the range of $10^{-6}$ to $10^{-10}$ torr depending upon whether some of the generator sees the inside of the spacecraft or it is fully exposed to space, the deoxidation or disappearance of the corrosion in vacuum takes place so that within a period of 1 to 7 days substantially all the corrosion is removed from the foil layers. It is expected that the pressure of the air between the layers of the foil will drop to $10^{-3}$ to $10^{-4}$ torr within a few hours after launch but that the mechanism of loss of the corrosion may take considerably longer. Thermal calculations show that the temperature of the hottest foil layer in the generator should rise from 600° C. in air to approximately 800° C. solely due to the lack of gaseous conduction and convection. Then the subsequent slow removal of the corrosion from the foil layers, which takes place in a few days, drops the emissivities of the corroded foils from values in the order of 0.5 to 0.8 down to values in the order of 0.04 to 0.09. This dramatic change in emissivity will then permit the generator's heat source and hottest foil layers to reach their normal operating temperature at the hottest foil of 1060 degrees C., with very small heat loss. The temperature distribution in the foils will them go from 1060 degrees C. at the hottest foil, to about 260 degrees C. at the coolest one.

In some cases it may be found desirable to make the foil of a suitable less-noble base metal or substrate that is plated or coated by a material such as rhodium so that the surface of the foil has the above-specified five characteristics. The substrate material should be one such as titanium or tantalum that will withstand the high operating temperature and will not interact or diffuse with the metal plated thereon. It may be desirable to place a diffusion-barrier coating between the highly reflective metal (such as rhodium) and the substrate. The coating of the substrate by the desired metal, such as rhodium, may be done in various ways such as electroplating, vapor deposition, flame spraying, etc.

In our multiple-foil thermal insulation, the insulation is thin (0.37 inch in the example described) and hence permits small and light weight assemblies. It also provides a good match of thermal gradient for thermocouple elements in which it is sometimes desired to drop 538 degrees C. in one-quarter to one inch distance. This high allowable thermal gradient for a given heat loss flux is useful in other energy conversion devices such as thermionic diodes and dynamic conversion systems. The heat sources being insulated can include, for example, radioisotopes, nuclear fission reactors such as plutonium 238, chemical heat sources, and magneto-hydrodynamic components.

In the thermoelectric generator for use in a satellite as has been described, our multiple-foil thermal insulation provides desirable safety features as previously indicated. This insulation permits the heat source to operate at several hundred degrees lower than vacuum temperatures when in a gaseous atmosphere. For space applications this permits the heat source container to retain its higher strength at the lower temperatures when on the earth. This is of particular significance for nuclear heat sources such as radioisotopes and nuclear fission reactors (with radioactivity in fuel rods) because it is desirable for their container to maintain the maximum strength in the vicinity of the earth in case of fires, explosions, or launch absorts in which the heat source falls back to earth from considerable altitudes. The reason that the heat source operates at the lower temperature in the atmosphere before launch is because, as previously discussed, there is conduction of heat away from the heat source by the atmosphere, and also because the multiple-foil assembly is a relatively poor insulator because of the poorly reflecting surface of the metal due to the oxidation or corrosion which later evaporates in space.

The thermal insulation which has been described is designed with interleaved filler material (Fibrefrax in the example described) which is capable of permitting the insulation to operate normally through its entire environmental regime up to some desired maximum temperature at which time the interleaved material softens or otherwise changes state in order to provide a conduction path from foil to foil to prevent destructive runaway of the heat source temperature. The heat source temperature might run away, i.e., rise to a high value, as a result of thermocouple breakage, for example, since broken thermocouples would not conduct heat away from the heat source.

An advantage of the paper or cloth filler materials is that the filler can act thus as a thermal overshoot safety device by softening or otherwise changing state at some desired temperature in order to prevent thermal runaway of the heat source that would result in destruction of the fuel-containing capsule and release of the radioisotope or nuclear fission material in space.

In the specific generator described, the interleaved filler material is Fibrefrax which softens at 1260 degrees C. The outer container of the fuel capsule is of Hastelloy-X which melts at a temperature of about 1350 degrees C. The inner container of the fuel capsule is of a molybdenum alloy TZM which melts at 2607 degrees C. but which quickly oxidizes to destruction if air reaches it when its temperature is about 650 degrees C. or above. Before the temperature rises high enough to damage the outer container of Hastelloy-X to permit air to reach the inner container, the Fibrefrax softens so that there is increased conduction between rhodium foils thus reducing the heat insulation and dropping the capsule temperature several hundred degrees. This is of importance when a spacecraft containing the thermoelectric generator is on the ground prior to launch and also later when it is reentering the atmosphere. It may be found desirable to have the metal foil of the multiple-foil thermal insulation in a continuous strip so that it is under slight tension after the thermal insulation cylinder is formed. The metal foil layers will then tend to pull into contact with each other in spots when the interleaved material softens.

Figure 14:
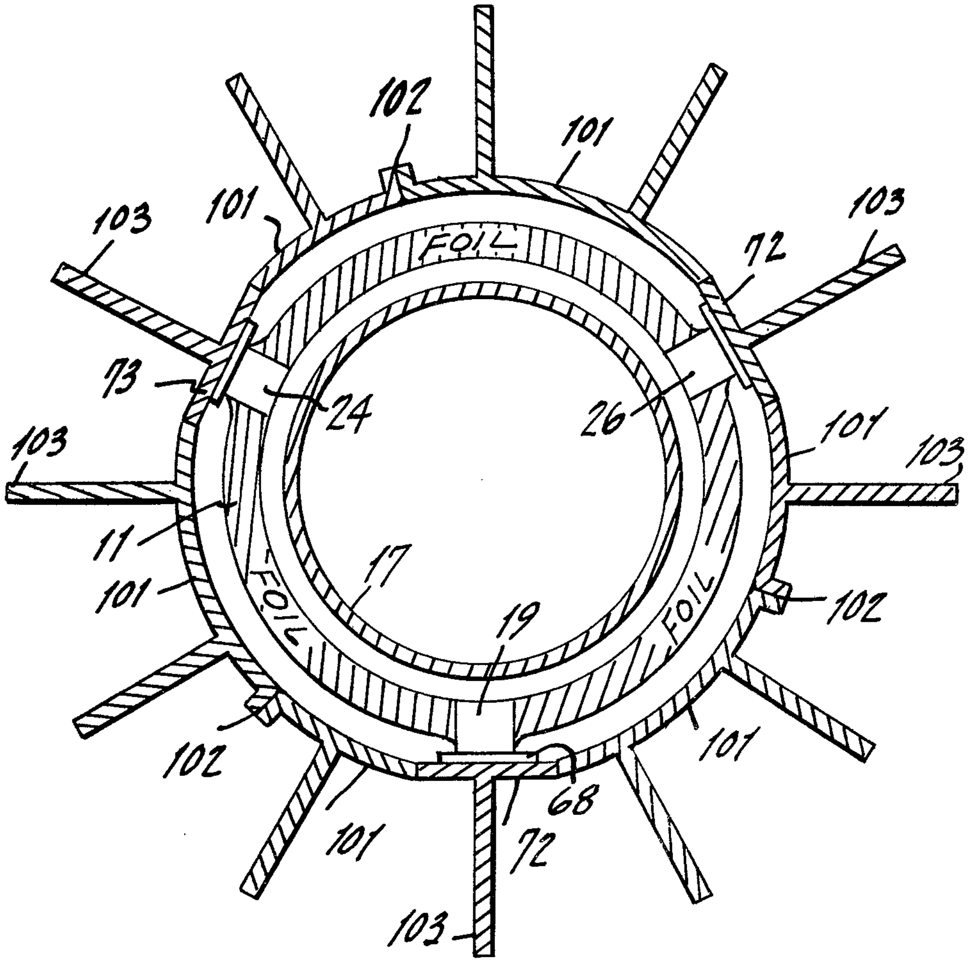
FIG. 14 is a view, partly in cross section, of a thermoelectric generator constructed in accordance with another embodiment of the invention.

While our thermoelectric generator has been described as being particularly valuable for use in a satellite, it is also valuable for other uses, as for example a power supply for a communication relay station located at some remote point on earth. When so used, the thermoelectric generator as above described may be placed in a container that is evacuated. Preferably, a structure such as shown in FIG. 14 is employed. The main part of this generator is the same as that previously described. It comprises the fuel capsule 17, the thermal insulation cylinder 11, and the thermocouple banks 19, 24 and 26 (indicated schematically).

In the structure of FIG. 14, the triangular radiators are not used. Instead, the heat conducting aluminum sheets 72 are brazed to aluminum sheets 101 which extend around the generator to form a cylinder. In assembling the structure, adjacent sheets are bolted and brazed together as indicated at 102. A disk of aluminum is brazed to the bottom of the cylinder formed by sheets 101 to close the bottom. After the fuel capsule has been inserted, a disk of aluminum is brazed to the top of the cylinder formed by sheets 101 to complete the closing of the cylinder, thus providing a container that can be evacuated.

Strips of aluminum 103 are brazed to the aluminum sheets 101 to act as radiators. These radiators extend the length of the cylindrical container formed by the sheets 101, and extend radially from the cylinder. Heat from the thermocouple banks is conducted by the aluminum sheets 72 and 101 to the radiators 103.

After the evacuation of the container, any oxide or corrosion on the metal foil of the thermal insulation evaporates as has been described. After evacuation, the container is sealed. Getters may be placed in the container for improving the vacuum in the event that it deteriorates after a period of time. With the generator of FIG. 14 in which the metal foil of the thermal insulation may be allowed to oxidize or corrode without damaging the generator (since the oxide or corrosion evaporates in a vacuum) various problems are avoided. If, contrary to the present invention, the metal foil of the insulation were such that its oxide or corrosion would not evaporate in vacuum at normal operating temperatures, it would be necessary to drop the fuel capsule in place in the generator, and then promptly seal the generator container and evacuate it before the fuel capsule had time to heat the metal foil of the insulation hot enough for it to oxidize or corrode in the surrounding atmosphere; any undue delay in pumping the container to the desired vacuum would result in oxidation or corrosion of the foil causing permanent damage to the thermal insulation, and, therefore, to the generator.

In some cases it may not be required that the thermoelectric generator supply power for a long period of time. In that case the fuel may be a radioisotope having a short half life, such as a few months. For example, polonium-210 having a half life of about 4½ months might be used. Since the heating ability of such a radioisotope decreases as it decays, it is desirable that a portion of the multiple-foil thermal insulation start off as a poor heat insulator and that this portion of thermal insulation gradually become a better heat insulator during this decay so that there is no great change in the heat applied to the energy conversion device during the period the generator is to be in operation.

Figure 15:
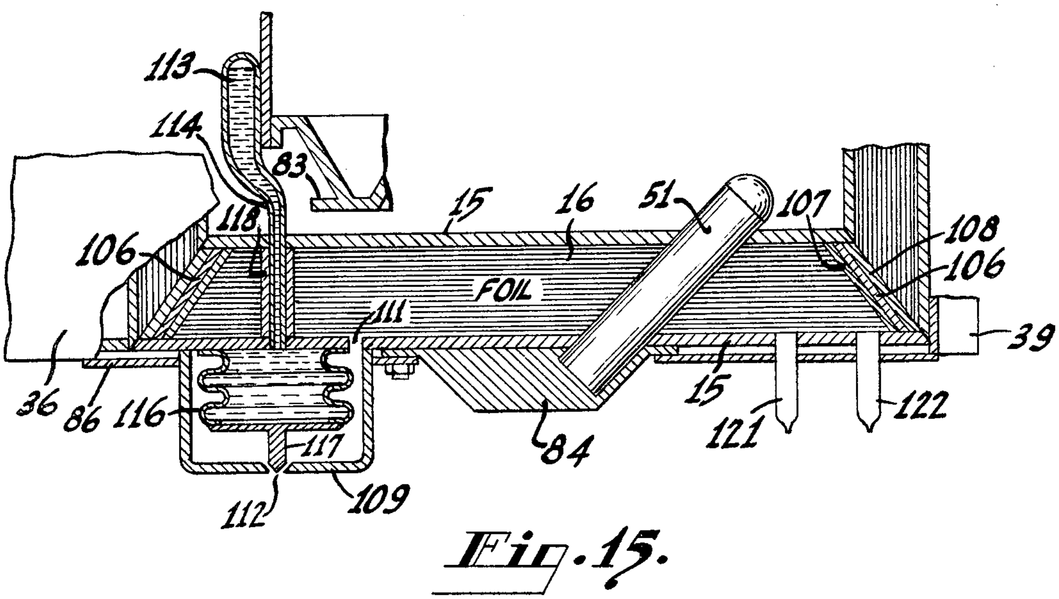

In a generator to be launched into space, this may be accomplished as follows. Refer to FIG. 15.

FIG. 15 shows how the lower end of FIG. 9 may be modified by filling the lower end of the multiple-foil insulating chamber with an inert gas such as argon, and providing a gas valve that is opened to let some of the gas leak out in response to a drop in the temperature of the fuel capsule. It is here assumed that the strontium-90 has been replaced by a short half-life fuel such as polonium-210.

In FIG. 15 the layers of foil 16 are enclosed in a gas tight structure. A metal strip 106 encloses the periphery of the insulating chamber end portion. It is brazed or welded to the upper and lower plates 15. Suitable insulating strips 107 and 108 are on each side of the metal strip 106 so that the foil layers will not be connected to each other by the strip 106. The ceramic tubes 51 are bonded to the plates 15 to insure a gas tight structure. The plates 15 and the strip 106 may be of Hastelloy-X.

To provide the gas leakage control, a cup-shape member 109 is brazed or welded to the lower plate 15, there being a hole cut in the supporting plate 86 to permit this. An opening 111 in the plate 15 permits gas to flow into the cup 109. The bottom of the cup 109 is provided with a needle valve 112 that is shown in its open position.

The needle valve 112 is opened or closed as a function of the temperature of the outer wall of the fuel capsule. This is accomplished by means of a temperature sensing bulb 113 that is in contact with the fuel capsule. The bulb 113 is filled with lithium, for example, which expands as it is heated. The bulb 113 is connected by a small diameter metal tube 114 to a bellows 116 which carries the needle 117 of the needle valve. The bellows is brazed or welded to the lower plate 15. The tube 114 passes through an opening that has been drilled through the plates 15 and the foil layers 16. The tube 114 should be brazed or welded to the plates 15 to prevent gas leakage. It may be desirable to surround the tube 114 by insulation 118 to avoid any metal connection between foil layers.

In operation in space, so long as the outside of the fuel capsule is above a certain temperature the lithium is expanded enough to expand the bellows and close the needle valve 112. When the fuel capsule drops below this temperature, the needle valve 112 opens and some of the argon leaves the multiple-foil insulation so that it becomes a better heat insulator whereby the fuel of decreased heating ability will bring the fuel capsule above said certain temperature. Thus the hot junctions are held at approximately the same temperature as the fuel decays.

Before launch the end of the insulating chamber is filled with argon at atmospheric pressure, for example. This may be done by connecting a tank of argon to a gas fill tube 121 so that the atmosphere is forced out through an air purge tube 122. After the air has been replaced by argon, the tubes 121 and 122 are pinched closed so they are gas tight. These tubes are brazed or welded to the lower plate 15. The tubes 121 and 122, and the cup 109 and other metal parts, may be made of Hastelloy-X.

The supporting plate 86 is attached through insulating gaskets to the radiators 36, 37 and 38 so that its temperature can be higher than that of the radiators.

The structure shown in FIG. 15 takes excess heat away from the fuel capsule but doesn't change the temperature of the cold junctions or the main radiators whereby the energy conversion device operates with substantially constant efficiency without having to raise the hot junction temperature at the beginning of the life of the fuel.

If desired, both ends of the multiple-foil insulating chamber may be constructed as described with reference to FIG. 15, for the purpose of providing a more rapid temperature control.

What is claimed is:

1. A thermoelectric generator comprising:
a chamber formed of multiple-foil thermal insulation,
said chamber having therein a heat source,
said chamber having an opening in its wall,
an energy conversion device which converts heat to electricity positioned in said opening,
said device having elements to be heated facing said heat source and having elements to be cooled at the exterior of said chamber,
said thermal insulation comprising layers of metallic foil from Group VIII, Fifth and Sixth period of the Period Table,
said layers being separated from each other to minimize conduction of heat from one foil layer to the next foil layer,
at least the surface of said metallic foil being of a metal that will oxidize or corrode slightly when heated in the atmosphere to a certain temperature to form a corrosion that is stable in the atmosphere and which reduces the reflectivity of said foil surface to infrared radiation,
said metal also being characterized in that said corrosion will evaporate or disappear in a vacuum thereby increasing said reflectivity.

2. A thermoelectric generator comprising:
a chamber formed of multiple-foil thermal insulation,
said chamber having therein a heat source,
said chamber having an opening in its wall,
an energy conversion device which converts heat to electricity positioned in said opening,
said device having elements to be heated facing said heat source and having elements to be cooled at the exterior of said chamber,
said thermal insulation comprising layers of metallic foil from Group VIII, Fifth and Sixth period of the Period Table,
said layers being separated from each other to minimize conduction of heat from one foil layer to the next foil layer,
at least the surface of said metallic foil being of a metal that will oxidize or corrode slightly when heated in the atmosphere to a temperature of 500 degrees C. or above to form a corrosion that is stable in the atmosphere and which reduces the reflectivity of said foil surface to infrared radiation, said metal also being characterized in that said corrosion will evaporate or disappear in a vacuum thereby increasing said reflectivity.

3. A thermoelectric generator comprising:
a chamber formed of multiple-foil thermal insulation,
said chamber having therein a heat source,
said chamber having an opening in its wall,
an energy conversion device which converts heat to electricity positioned in said opening, said device having elements to be heated facing said heat source and having elements to be cooled at the exterior of said chamber,
said thermal insulation comprising layers of metallic foil from Group VIII, Fifth and Sixth period of the Periodic Table,
said layers being separated from each other to minimize conduction of heat from one foil layer to the next foil layer,
at least the surface of said metallic foil being of a metal that will not melt or disintegrate in the atmosphere at a temperature of 1000 degrees C. or below, that has an average reflectivity of at least 80 percent to infrared radiation, and that has the characteristic that it is oxidized or corroded at a slow rate to a slight extent by heating in the atmosphere whereby said reflectivity is reduced, which oxidization or corrosion will evaporate or disappear in a vacuum thereby restoring substantially the original reflectivity.

4. A thermoelectric generator comprising:
a chamber formed of multiple-foil thermal insulation,
said chamber having therein a heat source,
said chamber having an opening in its walls,
an energy conversion device which converts heat to electricity positioned in said opening, said device having elements to be heated facing said heat source and having elements to be cooled at the exterior of said chamber,
said thermal insulation comprising layers of metallic foil from Group VIII, Fifth and Sixth period of the Periodic Table,
said layers being separated from each other to minimize conduction of heat from one foil layer to the next foil layer,
at least the surface of said metallic foil being of a metal that will not melt or disintegrate in the atmosphere at a temperature of 1000 degrees C. or below, that has an average reflectivity of at least 80 percent to infrared rays of a wavelength in the region of from about 0.8 micron to about 15 microns, that has a slow corrosion rate at temperatures of about 500 degrees C. and above which forms a corrosion that is relatively stable in the atmosphere, and that has the characteristic that after it is corroded the resulting corrosion will evaporate or disappear in a vacuum.

5. A thermoelectric generator comprising:
a chamber formed of multiple-foil thermal insulation,
said chamber having therein a heat source that will heat the inner wall of said chamber to a temperature of at least 1000 degrees C.,
said chamber having at least one opening in its wall for admitting thermocouples,
a bank of thermocouples positioned in said opening with their hot-junctions facing said heat source and with their cold-junctions at the exterior of said chamber,
said thermal insulation comprising layers of metallic foil from Group VII, Fifth and Sixth period of the Periodic Table,
said layers being separated from each other to minimize conduction of heat from one foil layer to the next foil layer,
at least the surface of said metallic foil being of a metal that will not melt or disintegrate at the temperature to which said inner wall is heated, that has an average reflectivity at least 80 percent to infrared radiation, that has a slow corrosion rate at temperatures of 500 degrees C. and above and forms a corrosion that is relatively stable in the atmosphere, and that has the characteristic that after it is corroded the resulting corrosion will evaporate or disappear in vacuum.

6. A thermoelectric generator comprising:
a chamber formed of multiple-foil thermal insulation,
said chamber having therein a heat source which comprises a capsule containing a nuclear heat source material,
said chamber having an opening in its wall,
an energy conversion device positioned in said opening,
said thermal insulation comprising layers of metallic foil from Group VIII, Fifth and Sixth period of the Periodic Table that will withstand a high temperature,
said foil layers being separated from each other by an interleaved material to minimize conduction of heat from one foil layer to the next foil layer,
said interleaved material being characterized in that it will change its state to cause increased heat transfer from one foil layer to the next foil layer at a lower temperature than that which will damage said capsule whereby release of said nuclear material from said capsule is avoided.

7. A thermoelectric generator comprising:
a chamber formed of multiple-foil thermal insulation,
said chamber having therein a heat source which comprises a capsule containing a nuclear heat source,
said chamber having an opening in its wall,
an energy conversion device which converts heat to electricity posiitoned in said opening, said device having elements to be heated facing said heat source and having elements to be cooled at the exterior of said chamber,
said thermal insulation comprising layers of metallic foil from Group VIII, Fifth and Sixth period of the Periodic Table,
said layers being separated from each other by an interleaved material to minimize conduction of heat from one foil layer to the next foil layer,
at least the surface of said metallic foil being of a metal that will not melt or disintegrate in the atmosphere at a temperature of 1000 degrees C. or below, that has an average reflectivity of at least 80 percent to infrared radiation, and that has the characteristic that it is oxidized or corroded at a slow rate to a slight extent by heating in the atmosphere whereby said reflectivity is reduced, which oxidization or corrosion will substantially disappear in a vacuum thereby restoring substantially the original reflectivity,
said interleaved material being characterized in that it will soften at a lower temperature than a melting temperature of any of the material of said capsule.

8. An electrical generator comprising in combination:
a container that is evacuated,
a thermoelectric generator located in said evacuated container,
said thermoelectric generator comprising a chamber formed of mutliple-foil thermal insulation,
said chamber having therein a heat source,
said chamber having an opening in its wall,
an energy conversion device which converts heat to electricity positioned in said opening, said device having elements to be heated facing said heat source and having elements to be cooled at the exterior of said chamber,
said thermal insulation comprising layers of metallic foil from Group VIII, Fifth and Sixth period of the Periodic Table,
said layers being separated from each other to minimize conduction of heat from one foil layer to the next foil layer,
at least the surface of said metallic foil being of a metal that will oxidize or corrode slightly when heated in the atmosphere to a certain temperature to form a corrosion that is stable in the atmosphere and which reduces the reflectivity of said foil surface to infrared radiation, said metal also being characterized in that said corrosion will evaporate or disappear in a vacuum thereby increasing said reflectivity.

9. An electrical generator comprising in combination:
a container that is evacuated,
a thermoelectric generator located in said evacuated container,
said thermoelectric generator comprising a chamber formed of multiple-foil thermal insulation,
said chamber having therein a heat source,
said chamber having an opening in its wall,
an energy conversion device which converts heat to electricity positioned in said opening, said device having elements to be heated facing said heat source and having elements to be cooled at the exterior of said chamber,
said thermal insulation comprising layers of metallic foil from Group VIII, Fifth and Sixth period of the Periodic Table,
said layers being separated from each other to minimize conduction of heat from one foil layer to the next foil layer,
at least the surface of said metallic foil being of a metal that will not melt or disintegrate in the atmosphere at a temperature of 1000 degrees C. or below, that has a reflectivity of at least 80 percent to infrared radiation, and that has the characteristic that any oxide or corrosion formed thereon when the foil is heated in the atmosphere to a temperature of 500 degrees C. or above will evaporate or disappear in a vacuum.

10. A thermoelectric generator comprising a chamber formed of multiple-foil thermal insulation, said chamber having therein a heat source which gradually decreases in its heating ability, said chamber having an opening in its wall, an energy conversion device which converts heat to electricity positioned in said opening, said device having elements to be heated facing said heat source and having elements to be cooled at the exterior of said chamber, said thermal insulation comprising layers of metallic foil from Group VIII, Fifth and Sixth period of the Periodic Table, said layers being separated from each other to minimize conduction of heat from one foil layer to the next foil layer, and means for making a portion of said multiple-foil thermal insulation gradually become a better heat insulator as said heat source decreases in its heating ability.

11. A thermoelectric generator comprising a chamber formed of multiple-foil thermal insulation, said chamber having therein a nuclear heat source which slowly decreases in its heating ability, said chamber having an opening in its wall, an energy conversion device which converts heat to electricity positioned in said opening, said device having elements to be heated facing said heat source and having elements to be cooled at the exterior of said chamber, said thermal insulation comprising layers of metallic foil from Group VIII, Fifth and Sixth period of the Periodic Table, said layers being separated from each other to minimize conduction of heat from one foil layer to the next foil layer, at at least one end of said chamber there being a certain amount of inert gas between said layers to increase said conduction of heat so long as said gas is present, and means for causing a portion of said gas to leak out from between said layers to decrease said conduction of heat in response to said heat source decreasing in its heating ability.

12. A thermoelectric generator comprising a chamber formed fo multiple-foil thermal insulation, said chamber having therein a nuclear heat source which slowly decreases in its heating ability, said chamber having an opening inside an energy conversion device which converts heat to electricity positioned in said opening, said device having elements to be heated facing said heat source and having elements to be cooled at the exterior of said chamber, said thermal insulation comprising layers of metallic foil from Group VIII, Fifth and Sixth period of the Periodic Table, said layers being separated from each other to minimize conduction of heat from one foil layer to the next foil layer, at least one end of said chamber being sealed and having therein a certain amount of inert gas between said layers to increase said conduction of heat so long as said gas is present, and means for causing a portion of said gas to leak out from between said layers to decrease said conduction of heat in response to said heat source decreasing in its heating ability.

References Cited

UNITED STATES PATENTS 3,009,601 11/1961 Matsch.
3,035,416 5/1962 Wagner ---------- 136—208 X
3,075,030 1/1963 Elm et al. ---------- 136—208
3,269,873 8/1966 Dent -------------- 136—208

ALLEN B. CURTIS, Primary Examiner

U.S. Cl. X.R.

229—3.5; 250—106

UNITED STATES PATENT OFFICE
CERTIFICATE OF CORRECTION

Patent No. 3,510,363 Dated May 5, 1970

Inventor(s) Seymour H. Winkler & Rudolph R. Laessig

It is certified that error appears in the above-identified patent and that said Letters Patent are hereby corrected as shown below:

Column 3, line 21, reads "requider" should be -- required --.

Column 4, line 23, reads "Fig. 11" should be -- Fig. 15 --.

Column 5, line 45, reads "iagara" should be -- Niagara --.

Column 6, line 15, reads "cage 31" should be -- cage 32 --.

Column 12, line 71, reads "them" should be -- then --.

Column 13, line 38, reads "absorts" should be -- aborts --.

Column 16, line 13, reads "Period" should be -- Periodic --.

Column 16, line 37, reads "Period" should be -- Periodic --.

Column 17, line 40, reads "Group VII" should be -- Group VIII --.

SIGNED AND SEALED FEB 9 1971

(SEAL)
Attest:

Edward M. Fletcher, Jr.
Attesting Officer

WILLIAM E. SCHUYLER, JR.
Commissioner of Patents